United States Patent
Lu et al.

(10) Patent No.: US 8,443,182 B2
(45) Date of Patent: May 14, 2013

(54) MEDIA DATA PLAYBACK DEVICE AND REBOOT METHOD THEREOF

(75) Inventors: Chi-Chang Lu, Taipei Hsien (TW); Deng-Rung Liu, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 435 days.

(21) Appl. No.: 12/768,738

(22) Filed: Apr. 28, 2010

(65) Prior Publication Data

US 2011/0246758 A1  Oct. 6, 2011

(30) Foreign Application Priority Data

Mar. 30, 2010  (CN) .......................... 2010 1 0136237

(51) Int. Cl.
  *G06F 9/00*  (2006.01)
  *G06F 9/24*  (2006.01)
  *G06F 15/177*  (2006.01)

(52) U.S. Cl.
  USPC .................................................. 713/2; 713/1

(58) Field of Classification Search .................... 713/1, 2
  See application file for complete search history.

(56) References Cited

U.S. PATENT DOCUMENTS

| | | | |
|---|---|---|---|
| 6,560,685 B1 | 5/2003 | Jackson | |
| 6,732,265 B2* | 5/2004 | Esfahani et al. | 713/2 |
| 2002/0129191 A1* | 9/2002 | DaCosta | 711/103 |
| 2004/0044838 A1* | 3/2004 | Nickel et al. | 711/104 |
| 2006/0053268 A1* | 3/2006 | Fontijn et al. | 712/1 |
| 2008/0052507 A1* | 2/2008 | Chow et al. | 713/2 |
| 2008/0239552 A1* | 10/2008 | Kimura | 360/75 |
| 2008/0270811 A1* | 10/2008 | Chow et al. | 713/323 |
| 2009/0319720 A1* | 12/2009 | Stefanus et al. | 711/103 |
| 2010/0077194 A1* | 3/2010 | Zhao et al. | 713/2 |
| 2010/0185804 A1* | 7/2010 | Omizo et al. | 711/103 |
| 2011/0179264 A1* | 7/2011 | Desselle et al. | 713/2 |

* cited by examiner

*Primary Examiner* — Vincent Tran
(74) *Attorney, Agent, or Firm* — Altis Law Group, Inc.

(57) ABSTRACT

A media data playback device comprises first and second nonvolatile memories. The first nonvolatile memory stores a boot loader and a kernel of an operating system in a compressed format. The second nonvolatile memory serves as a main memory of the device. A processor executes the boot loader to load and decompress the kernel from the first nonvolatile memory to the second nonvolatile memory in response to a boot command. When receiving a shutdown command, the processor determines whether to perform a portion of bootstrapping processes of the device in response to the shutdown command before actually shutdown the device.

32 Claims, 7 Drawing Sheets

MEDIA DATA PLAYBACK DEVICE AND REBOOT METHOD THEREOF

BACKGROUND

1. Technical Field

The disclosure relates to computer technologies, and more particularly to a media data playback system and reboot method thereof.

2. Description of Related Art

TV converters, known as set-top boxes, manage the higher channel numbers not supported by TVs, descramble, decrypt, and decode channel signals into rich video content and other information, such as program guides. During the bootstrap of a set-top box, a boot loader is executed to clear a main memory, decompress and load and the OS from a flash memory to the main memory for execution. Since memory clearing and OS loading is a portion of the bootstrap process, reboot is also an option to solve system failure, for example, when a virtual memory area is erroneously overwritten. Decompressing and loading an OS, however, may be time consuming and delays video display.

DETAILED DESCRIPTION

Description of exemplary embodiments of media data playback device and reboot method thereof is given in the following paragraphs which are organized as:
1. System Overview
   1.1 Exemplary Reader Device
   1.2 Exemplary Embodiments of Main Memory
2. Exemplary operations of the media data playback device
   2.1 Operations Before Device Shutdown
   2.2 Operations During Device Bootstrapping
3. Conclusion

1. System Overview

The disclosed media data playback device can be implemented as a stand-alone device or integrated in various media data playback devices, such as a set top box, a cell phone, a tablet personal computer (PC), a laptop computer, a monitor, a multimedia player, a digital camera, a personal digital assistant (PDA), a navigation device or a mobile internet device (MID).

1.1 Exemplary Reader Device

Figure 1:
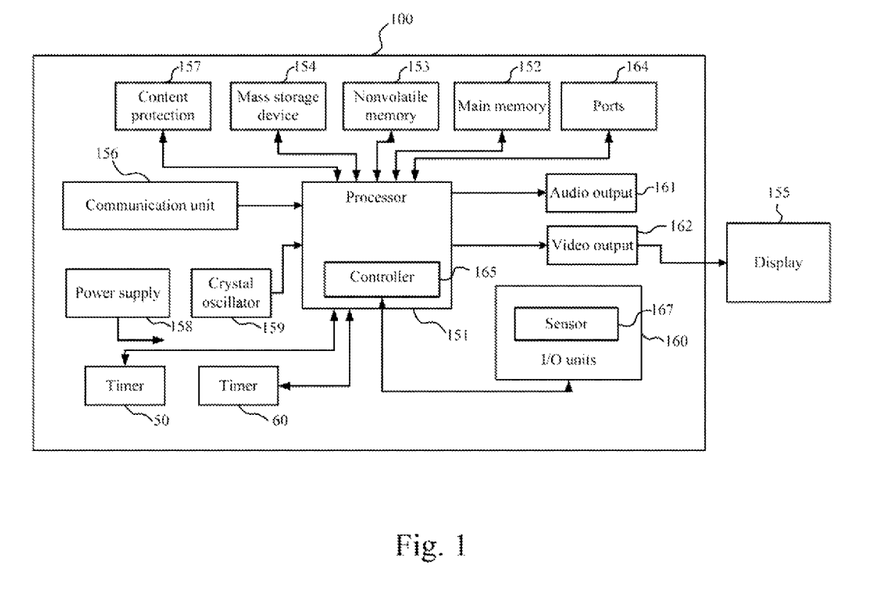
FIG. 1 is a block diagram of an exemplary embodiment of a media data playback device.

With reference to FIG. 1, a processor 151 comprises a central processing unit of the media data playback device 100. The processor 151 may comprise various integrated circuits (ICs) for processing data and machine-readable instructions. Connection of the components in the device 100 is shown in FIG. 1 and may comprise serial or parallel transmission buses, or wireless communication channels. A communication unit 156 establishes communication channels through which the media data playback device 100 may connect to and download media data streams from a remote station. Additionally, the communication unit 156 may establishes wireless communication channels through which a portable device, such as a remote control, may connect to and exchange data with the media data playback device 100. The communication unit 156 may comprise of antennas, baseband and radio frequency (RF) chipsets for wireless local area network (LAN) communication and/or cellular communication such as wideband code division multiple access (W-CDMA) and high speed downlink packet access (HSDPA). Through the established wireless communication channels, the device 100 may serve as a wireless LAN access point through which the portable device connects to the Internet.

The processor 151 may be packaged as a chip or comprise a plurality of chips interconnected through buses. For example, the processor 151 may only comprise of a central processing unit (CPU) or a combination of a CPU, a digital signal processor (DSP), and a chip of a communication controller, such as a chip of the communication unit 156. The communication controller may comprise one or more controllers of wired or wireless communication, such as a cellular communication, infrared, Bluetooth™, or wireless local area network (LAN) communication. The communication controller coordinates communication among components of the media data playback device 100 or communication between the media data playback device 100 and external devices.

A power supply 158 provides electrical power to components of the media data playback device 100. A crystal oscillator 159 provides clock signals to the processor 151 and other components of the media data playback device 100. The timers 50 and 60 keep track of predetermined time intervals and may comprise of circuits, machine-readable programs, or a combination thereof. Each of the timers 50 and 60 generates signals to notify expiration of the predetermined time intervals. Input and output (I/O) units 160 may comprise control buttons, an alphanumeric keypad, a touch panel, a touch screen, and a plurality of light emitting diodes (LEDs). A controller 165 detects operations on the I/O units 160 and transmits signals indicative of the detected operation to the processor 151. The controller 165 also controls operations of the I/O units 160. The processor 151 may control the I/O units 160 through the controller 165. Ports 164 may be used to connect to various computerized interfaces, such as an external computer, or a peripheral device. The ports 164 may comprise physical ports complying with universal serial bus (USB) and IEEE 1394 standards, recommended standard 232 (RS-232) and/or recommended standard 11 (RS-11) defined by Electronics Industries Association (EIA), serial ATA (STATA), and/or high-definition multimedia interface (HDMI).

A content protection system 157 provides access control to digital content reproduced by the device 100. The content protection system 157 may comprise memory and necessary devices for implementing digital video broadcasting—common interface (DVB-CI) and/or conditional access (CA). The device 100 may obtain digital content from broadcast signals through an antenna, a tuner, and a demodulator. Alternatively, the device 100 may obtain digital content from an information network, such as the Internet, through a network interface.

A video output unit 162 comprises filters and amplifiers for filtering and amplifying video signals output by the processor 151. An audio output unit 161 comprises a digital to analog converter converting audio signals output by the processor 151 from digital format to analog format.

A display 155 is operable to display text and images, and may comprise e-paper, a display made up of organic light emitting diode (OLED), a field emission display (FED), or a liquid crystal display (LCD). Alternatively, the display 155 may comprise a reflective display, such as an electrophoretic display, an electrofluidic display, or a display using interferometric modulation. The display 155 may display various graphical user interfaces (GUIs) as virtual controls including but not limited to windows, scroll bars, icons, and clipboards. The display 155 may comprise a single display or a plurality of displays in different sizes.

The I/O units 160 comprise a touch sensor 167 operable to detect touch operations on the display 155. The touch sensor 167 may comprise a transparent touch pad overlaid on the display 155 or arrays of optical touch transmitters and receivers located on the boarder of the display 155, such as those disclosed in U.S. patent publication No. 20090189878.

1.2 Exemplary Embodiments of Main Memory

Nonvolatile memory 153 stores an operating system (OS) and application programs executable by the processor 151. The processor 151 may load runtime processes and data from the nonvolatile memory 153 to the main memory 152 and store digital content in a mass storage device 154. The media data playback device 100 may obtain digital content such as multimedia data through the communication unit 156. The main memory 152 may comprise a nonvolatile random access memory (NVRAM), such as phase-change random access memory (PRAM), magnetoresistive random access memory (MRAM), or other NVRAM comprising organic bistable memory material, such as those disclosed in U.S. Pat. No. 7,405,167, U.S. patent publication No. 20090146140, or 20090221113. The nonvolatile memory 153 may comprise an electrically erasable programmable read-only memory (EEPROM) or a flash memory, such as a NOR flash or a NAND flash. In the following, a PRAM is described as an example of the main memory 152, and a flash memory is described as an example of the nonvolatile memory 153.

A PRAM is a non-volatile memory storing data using chalcogenide materials, such as Germanium-Antimony-Tellurium alloy (Ge-Sb-Te or GST). The crystalline and amorphous states of the phase-change material GST have different electrical resistivity. Phase change between the crystalline and amorphous states may be obtained by temperature control. Under 150° C., both phases are stable. Over 200° C., nucleation of crystallites is fast and if the material is kept to the crystallization temperature for a sufficient time, it changes phase and becomes crystalline. In order to change the phase back to the amorphous state, the chalcogenide temperature is brought over the melting point (about 600° C.) and rapidly reduced.

Figure 3:
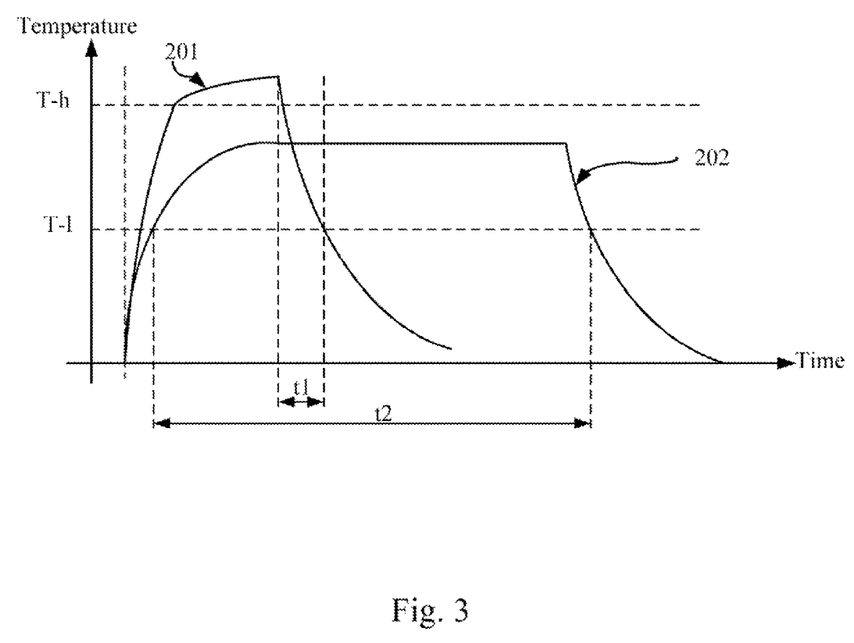
FIG. 3 is a schematic diagram showing an set and reset pulses of an exemplary embodiment of a phase change memory element.

FIG. 3 shows the plots of the required temperature versus time to activate phase changes of the phase-change material GST. T-h indicates the melting temperature of the phase-change material GST, and T-1 indicates the temperature at which crystallization of the phase-change material GST begins. A curve 201 referred to as a reset pulse shows temperature control for a phase change from the crystalline to the amorphous state, and curve 202 referred to as a set pulse shows temperature control for a phase change from the amorphous to the crystalline state. As shown, amorphization requires a short time but a high temperature heating followed by cooling in a very short time t1. Crystallization requires a long time heating (denoted by duration t2) to allow nucleation and crystal growing.

Figure 4:
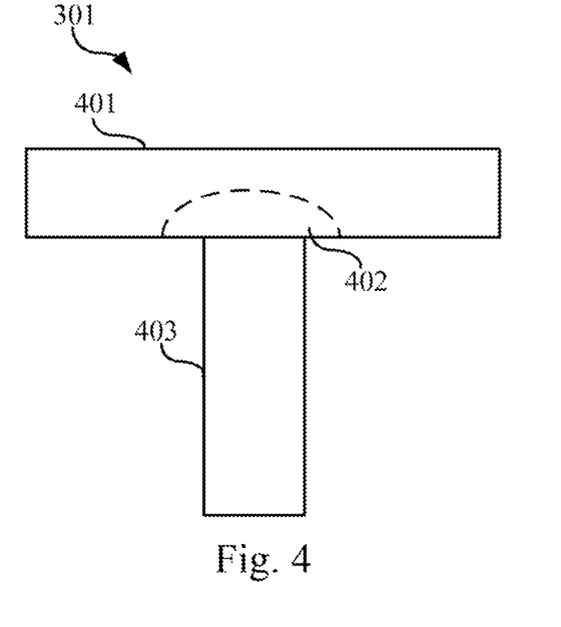
FIG. 4 is a schematic diagram of an exemplary embodiment of a cell of a phase change random access memory (PRAM).

FIG. 4 shows a memory device 301 made from the chalcogenide material. A heater 403 comprising a resistive electrode 403 in contact with or close to the chalcogenide material 401 may conduct current and be heated according to Joule effect to carry out the temperature control of set and reset pulses. The chalcogenide material 401 is generally in the crystalline state to allow good current flow. A portion 402 of the chalcogenide material 401 is in direct contact with the heater 403 and forms a phase change portion 402.

The state of the chalcogenide region 402 may be read by applying a sufficiently small voltage so as not to cause a sensible heating and measuring the current passing through it. Since the current is proportional to the conductance of the chalcogenide material, it is possible to discriminate between the two states.

Figure 5:
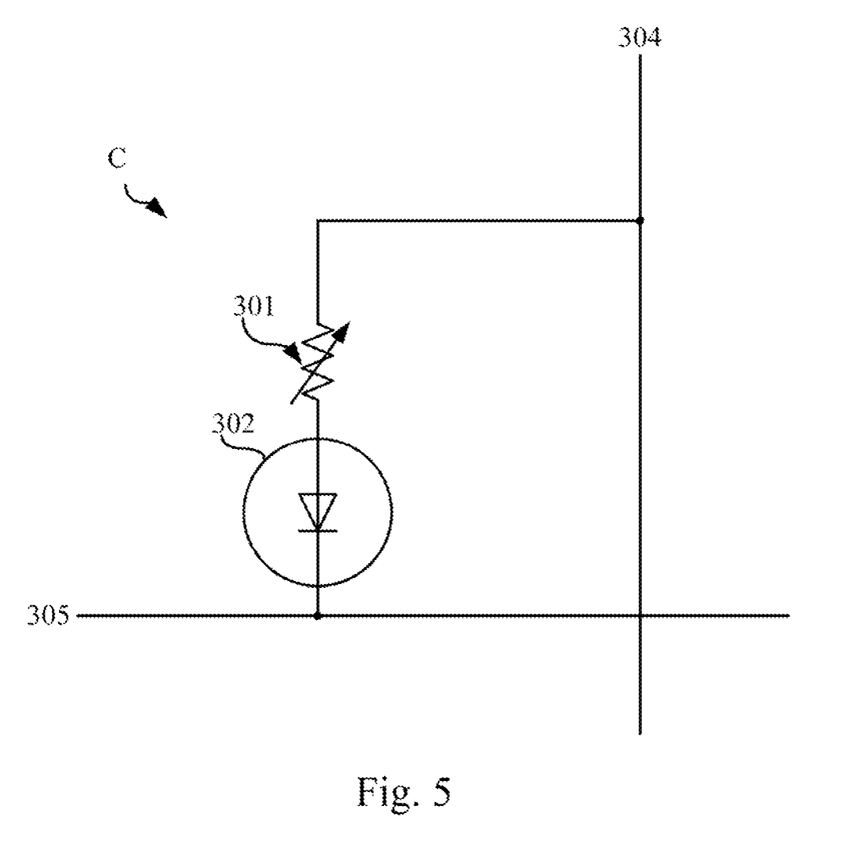
FIG. 5 is a cross section of an exemplary embodiment of a memory a cell of a PRAM.

FIG. 5 is an equivalent circuit diagram showing a unit cell C of a PRAM. The unit cell C of the PRAM includes the memory device 301 and a diode 302. The diode 302 is a selection element and may be replaced by a transistor. The memory device 301 comprises phase-change material and is connected to a bit line 304 and a P-junction of the diode 302. A word line 305 is connected to an N-junction of the diode 302.

The memory device 301 can be considered as a resistor, which conducts a different current according to its phase. When appropriately biased, the memory device 301 is defined as "set" or "logic 1" in condition of conducting a detectable current, and as "reset", or "logic 0" in condition of not conducting current or conducting a much lower current than a cell that is set.

The main memory 152 comprising an array of PRAM cells to provide random access to data stored in the main memory 152.

2. Exemplary Operations of the Media Data Playback Device

Figure 2:
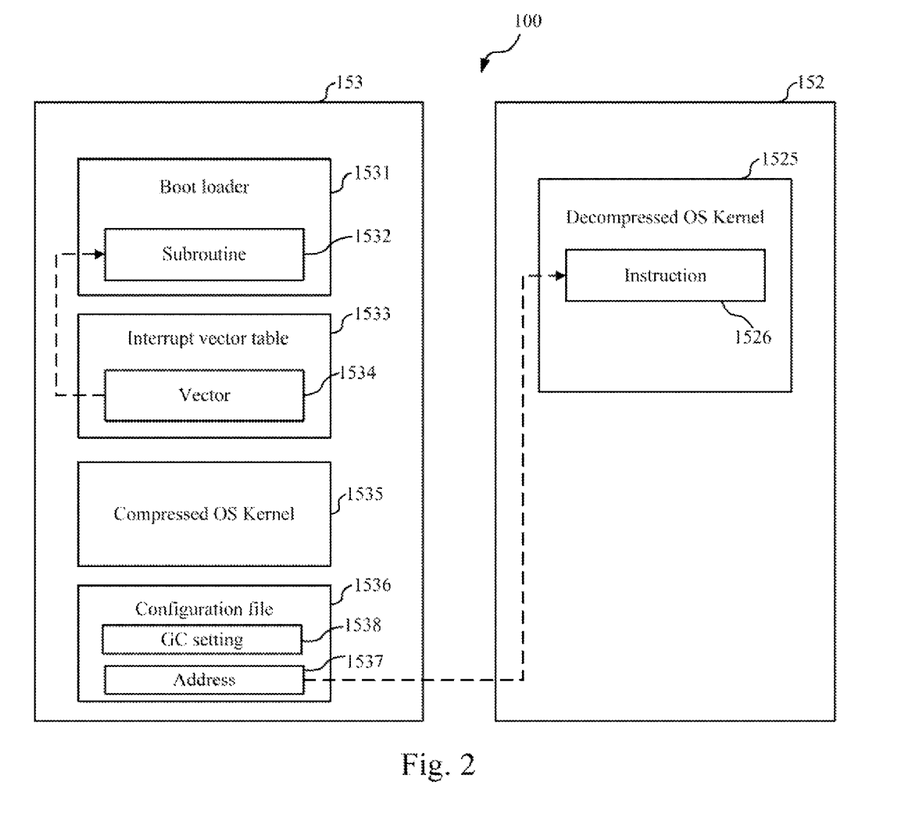
FIG. 2 is a block diagram of an exemplary embodiment of memory modules of the media data playback device.

With reference to FIG. 2, the nonvolatile memory 153 stores a boot loader 1531, a configuration file 1536 thereof, an operating system kernel 1535 in a compressed format, and an interrupt vector table 1533. A subroutine 1532 in the boot loader 1531 is registered as an interrupt service routine for an interrupt representative of a shutdown or power-off command and is targeted by a vector 1534 in the interrupt vector table 1533. The configuration file 1536 further comprises a garbage collection (GC) setting 1538 specifying options of garbage collection processes. The GC setting 1538 may be user adjustable or automatically configured by the processor 151 according to system usage, such as use time from last boot-strapping of the device 100.

When the I/O units 160 receives a depression of a power key of the media data playback device 100 a representative of a boot or power-on command, the processor 151 executes the boot loader 1531 to perform initialization and to trigger migration of the kernel 1535 in response to the boot command. Wherein, the migration of the kernel 1535 comprises loading and decompressing thereof from the nonvolatile memory 153 to the main memory 152, to generate kernel 1525 in the main memory 152. The processor 151 executes operations of the OS. The migration of the kernel 1535 in response to the boot command is referred to as a first migration of the kernel 1535.

2.1 Operations Before Device Shutdown

Figure 6:
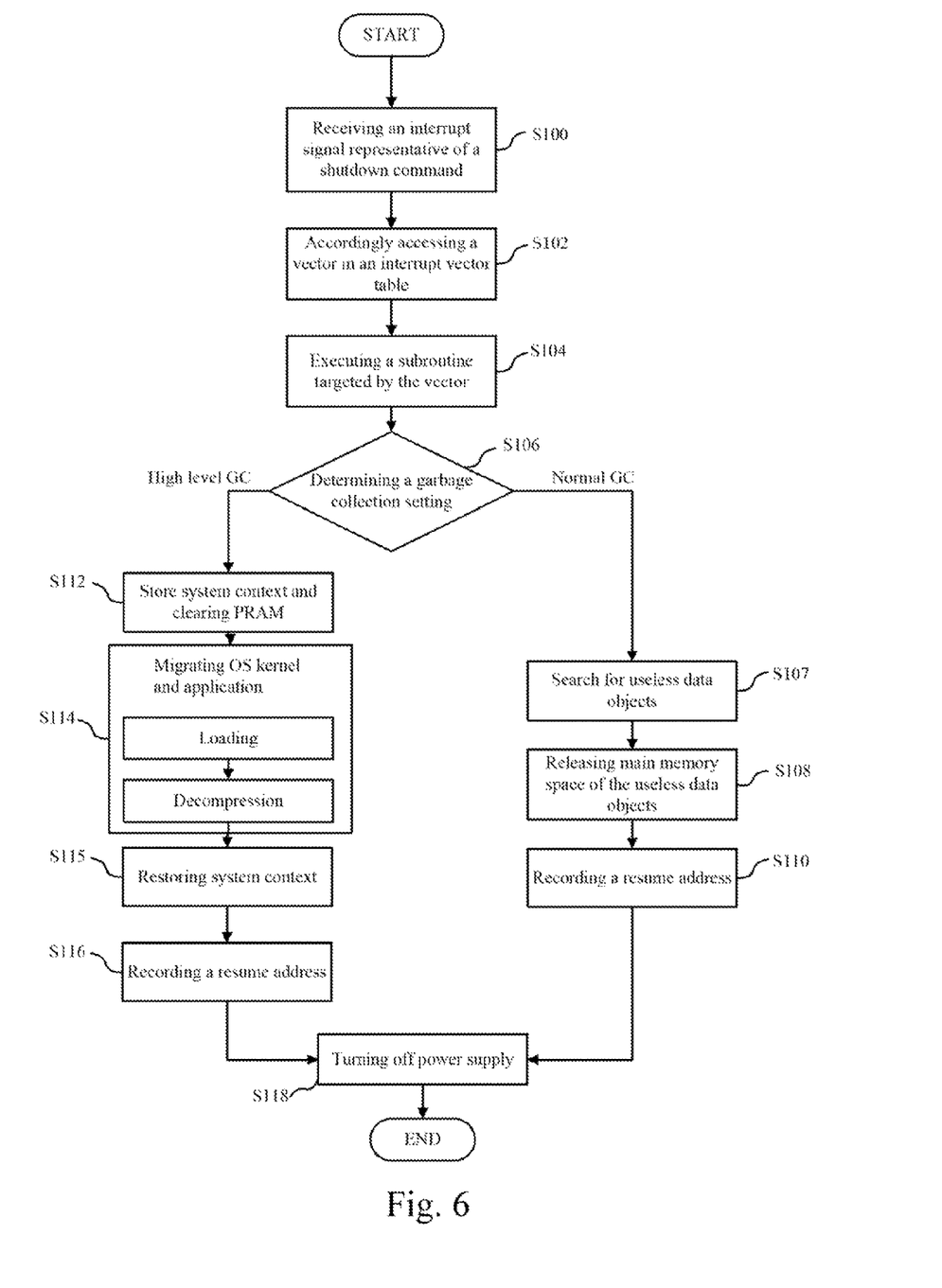
FIG. 6 is a flowchart showing exemplary operations of the media data playback device in response to a shutdown command.

With reference to FIG. 6, during operation of the media data playback device 100, the I/O units 160 receives depression of a power key of the media data playback device 100, and issues an interrupt signal representative of a shutdown command to the processor 151 (step S100). The processor 151 performs the following operations in response to the shutdown command. The processor 151 accesses a vector 1534 in the interrupt vector table 1533 corresponding to the interrupt signal (step S102), retrieves and executes a subroutine 1532 targeted by the vector 1534 (step S104). Under direction of the subroutine 1532, the processor 151 may display a shutdown message or disable video signal output, and performs one of a plurality of levels of garbage collection (GC) detailed in the following according to a GC setting.

The processor 151 determines a GC setting 1538 in a configuration file 1536 (step S106). In response to a GC setting indicative of normal garbage collection, the processor 151 searches the main memory 152 for data objects that cannot be accessed by other programs in the device 100 (step S107) and releases space of the main memory 152 occupied by these objects (step S108). The processor 151 records an address 1537 of the main memory 152 from which execution of the kernel 1535 is designated to resume (step S110) and triggers the device 100 to power off (step S118).

In response to a GC setting indicative of high level garbage collection, the processor 151 stores system context to the nonvolatile memory 153, clears the main memory 152 (step S112), triggers a further migration of the kernel 1535 and application programs from the nonvolatile memory 153 to the main memory 152 according to the stored system context (step S114), and restores system context (step S115). The clearing of the main memory 152 comprises deleting all data in the main memory 152. The migration of the kernel 1535 in response to the shutdown command is referred to as a second migration and comprises loading and decompressing of the compressed kernel 1535 from the nonvolatile memory 153 to the main memory 152. Similarly, the migration of the application programs comprises loading and decompressing thereof from the nonvolatile memory 153 to the main memory 152. The system context comprises hardware component configurations, page tables, process management data, process data structure of the application programs, and other system settings. In step S115, the processor 151 may restore a portion of the system context, for example, a portion thereof to the main memory 152. The remaining portions of the system context may be restored during subsequent bootstrapping of the device 100. Data and program distribution in the main memory 152 is rearranged through the step S114. The processor 151 records an address 1537 of the main memory 152 from which execution of the kernel 1535 is designated to resume in response to reboot of the media data playback device 100 (step S116) and triggers the device 100 to power off (step S118). For example, the processor 151 turns off the power supply 158.

The clearing of the main memory 152 and the migration of the kernel 1535 comprises a portion of bootstrapping processes of the device 100. Through the execution of steps S112 and S114, the processor 151 performs a portion of bootstrapping processes of the device 100 in response to the shutdown command before actually shutting down the device 100. The processor 151 may rearrange utilization of the main memory 152 after the migration of the kernel 1535 and other application programs before actually shutting down the device 100. Alternatively, in step S114, the processor 151 may only trigger migration of the kernel 1535. The processor 151 may disable other interrupt handling for any subsequent interrupt during execution of the steps S107, S108, S110, S112, S114, S115, and S116 and render these steps non-interruptible.

2.2 Operations During Device Bootstrapping

Figure 7:
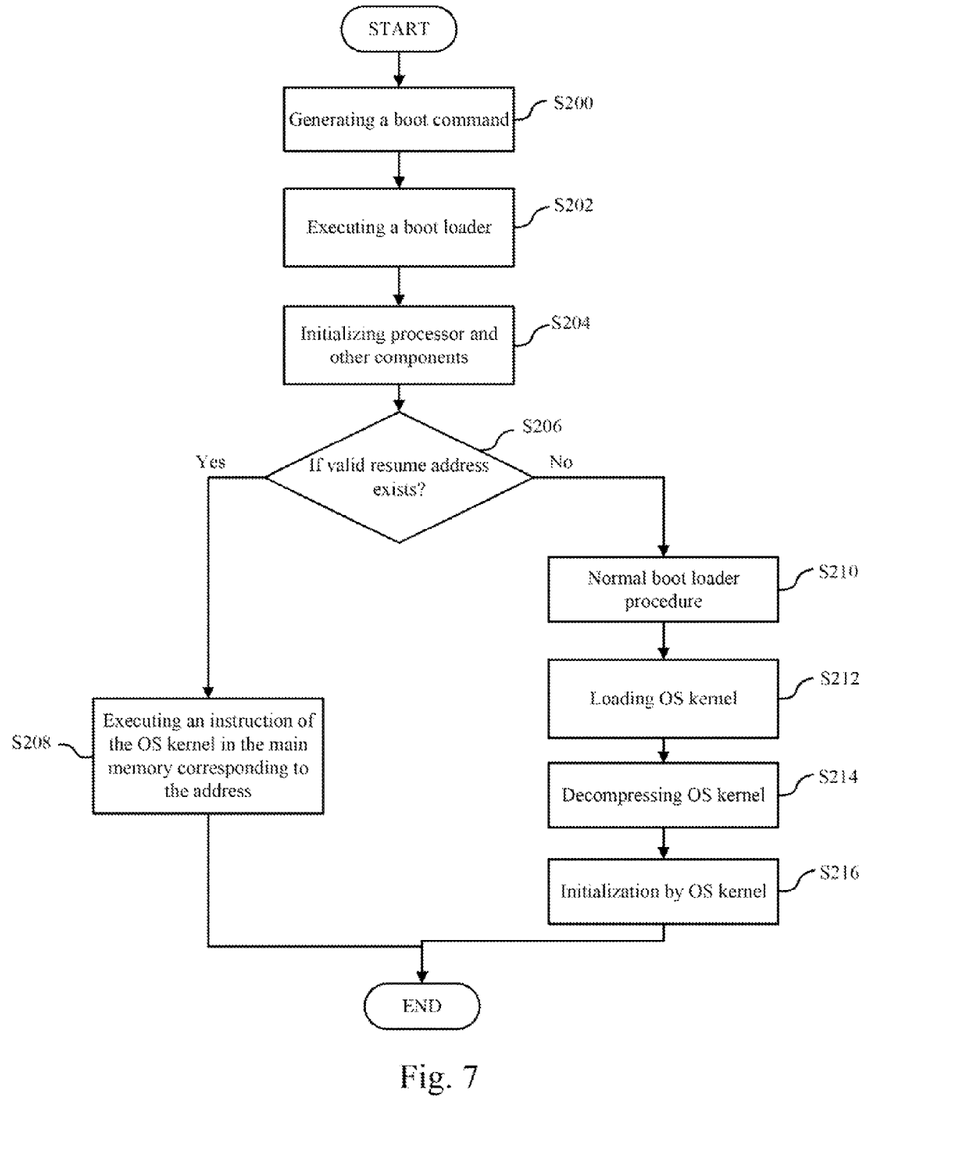
FIG. 7 is a flowchart showing exemplary operations of the media data playback device in response to a boot command.

With reference to FIG. 7, during power off state of the media data playback device 100, depression of the power key of the media data playback device 100 triggers a boot command to the processor 151 (step S200). The processor 151 performs the following operations in response to the boot command When receiving the boot command from the input unit, the processor 151 executes the boot loader 1531 (step S202). The boot loader 1531 directs initialization of the processor 151 and other components of the device 100 (step S204), and directs the processor 151 to determine if a valid resume address exists (step S206). When determining that the valid resume address 1537 exists, the processor 151 retrieves the stored resume address 1537 and executes an instruction 1526 of the kernel 1525 in the main memory 152 corresponding to the address 1537 (step S208). A dotted arrow in FIG. 2 shows relationship between the address 1537 and the instruction 1526. Thus, the processor 151 switches execution to the address 1537 of the main memory 152. Clearing of the main memory 152 and the migration of the kernel 1535 and application programs after the boot command is not performed, thus reducing time required for rebooting the device 100.

When determining that the valid resume address 1537 does not exist, the processor 151 executes normal procedure of the boot loader 1531 (step S210), loads and decompresses the OS kernel 1535 to generate the OS kernel 1525 (steps S212 and S214), and performs other system initialization under direction of the OS kernel 1525 (step S216).

3. Conclusion

In conclusion, one of different levels of garbage collection is performed between reception of a shutdown command and actual power-off of the device 100. Thus, memory utilization may be well managed to endure long-term usage. Procedures in normal bootstrapping, such as migration of OS kernel, are partially performed prior to actual booting of the device 100 to reduce boot time.

It is to be understood, however, that even though numerous characteristics and advantages of the disclosure have been set forth in the foregoing description, together with details of the structure and function of the present disclosure, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A media data playback device, comprising:
   a first nonvolatile memory operable to store a boot loader and a kernel of an operating system in a compressed format;
   a second nonvolatile memory operable as a main memory of the media data playback device, wherein an instance of a migration of the kernel comprises loading and decompressing of the compressed kernel from the first nonvolatile memory to the second nonvolatile memory;
   an input unit operable to receive a first boot command; and
   a processor operable to execute the boot loader to trigger a first instance of the migration of the kernel in response to the first boot command, and, upon receiving a shutdown command from the input unit, the processor determines whether to further trigger a second instance of the migration of the kernel before shutdown of the media data playback device in response to the shutdown command.

2. The media data playback device as claimed in claim 1, wherein the second nonvolatile memory comprises phase change random access memory.

3. The media data playback device as claimed in claim 1, wherein the first nonvolatile memory stores a garbage collection setting indicative of one of a plurality of garbage collection levels, and the processor further triggers the second instance of the migration of the kernel upon a condition that the garbage collection setting is indicative of a high level garbage collection, records in the first nonvolatile memory a resume address of the second nonvolatile memory from which execution of the kernel is designated to resume in response to reboot of the media data playback device, and the processor shuts down the media data playback device.

4. The media data playback device as claimed in claim 3, wherein the processor clears data in the second nonvolatile memory before the second instance of the migration of the kernel, and rearranges utilization of the second nonvolatile memory after the second instance of the migration of the kernel.

5. The media data playback device as claimed in claim 3, wherein the processor disables interrupt handing for any subsequent interrupt during the second instance of the migration of the kernel.

6. The media data playback device as claimed in claim 3, wherein upon receiving a second boot command from the input unit after the shutdown of the media data playback device, the processor executes the boot loader which switches execution to an instruction targeted by the resume address in the second nonvolatile memory.

7. The media data playback device as claimed in claim 3, wherein a subroutine in the boot loader directing the second instance of the migration of the kernel is registered as an interrupt service routine for an interrupt indicative of the shutdown command.

8. A media data playback device, comprising:
a first nonvolatile memory operable to store a boot loader and a kernel of an operating system in a compressed format;
a second nonvolatile memory operable as a main memory of the media data playback device, wherein an instance of a migration of the kernel comprises loading and decompressing of the compressed kernel from the first nonvolatile memory to the second nonvolatile memory;
an input unit operable to receive a first boot command; and
a processor operable to execute the boot loader to trigger a first instance of the migration of the kernel in response to the first boot command, and, upon receiving a shutdown command from the input unit, the processor performs garbage collection for the second nonvolatile memory before shutdown of the media data playback device in response to the shutdown command.

9. The media data playback device as claimed in claim 8, wherein the second nonvolatile memory comprises phase change random access memory.

10. The media data playback device as claimed in claim 8, wherein the first nonvolatile memory stores a garbage collection setting indicative of one of a plurality of garbage collection levels, and the processor further triggers a second instance of the migration of the kernel upon a condition that the garbage collection setting is indicative of a high level garbage collection, records in the first nonvolatile memory a resume address of the second nonvolatile memory from which execution of the kernel is designated to resume in response to reboot of the media data playback device, and the processor shuts down the media data playback device.

11. The media data playback device as claimed in claim 10, wherein the processor clears data in the second nonvolatile memory before the second instance of the migration of the kernel, and rearranges utilization of the second nonvolatile memory after the second migration of the kernel.

12. The media data playback device as claimed in claim 10, wherein the processor disables interrupt handing for any subsequent interrupt during the second instance of the migration of the kernel.

13. The media data playback device as claimed in claim 10, wherein upon receiving a second boot command from the input unit after the shutdown of the media data playback device, the processor executes the boot loader which switches execution to an instruction targeted by the resume address in the second nonvolatile memory.

14. The media data playback device as claimed in claim 10, wherein a subroutine in the boot loader directing the second instance of the migration of the kernel is registered as an interrupt service routine for an interrupt indicative of the shutdown command.

15. A reboot method executable by a media data playback device of which a first nonvolatile memory stores a boot loader and a kernel of an operating system in a compressed format, a second nonvolatile memory operable as a main memory of the media data playback device, wherein an instance of a migration of the kernel comprises loading and decompressing of the compressed kernel from the first nonvolatile memory to the second nonvolatile memory, the reboot method comprising:
receiving a first boot command from an input unit of the media data playback device, wherein the first boot command is operable to trigger a bootstrapping process of the media data playback device which at least comprises a manipulation process of clearing the main memory;
executing the boot loader to trigger a first instance of the migration of the kernel in response to the first boot command in the bootstrapping process, wherein the bootstrapping process further comprises a manipulation process of the main memory associated with the first instance of the migration of the kernel;
receiving a shutdown command from the input unit; and
performing a portion of the bootstrapping process of the media data playback device before shutdown of the media data playback device in response to the shutdown command, wherein the portion of the bootstrapping process comprises a manipulation process related to the main memory of the media data playback device.

16. The reboot method as claimed in claim 15, wherein the first nonvolatile memory stores a garbage collection setting indicative of one of a plurality of garbage collection levels, and the portion of a bootstrapping process comprises:
triggering a second instance of the migration of the kernel upon a condition that the garbage collection setting is indicative of a high level garbage collection;
wherein the reboot method further comprises:
recording in the first nonvolatile memory a resume address of the second nonvolatile memory from which execution of the kernel is designated to resume in response to reboot of the media data playback device; and
shutting down the media data playback device.

17. The reboot method as claimed in claim 16, further comprising:
clearing data in the second nonvolatile memory before the second instance of the migration of the kernel; and
rearranging utilization of the second nonvolatile memory after the second instance of the migration of the kernel.

18. The reboot method as claimed in claim 16, further comprising:
disabling interrupt handing during the second instance of the migration of the kernel.

19. The reboot method as claimed in claim 16, further comprising:
upon receiving a second boot command from the input unit after the shutdown of the media data playback device, executing the boot loader which switches execution to an instruction targeted by the resume address in the second nonvolatile memory.

20. The reboot method as claimed in claim 15, wherein the second nonvolatile memory comprises phase change random access memory.

21. A media data playback device, comprising:
a first nonvolatile memory operable to store a kernel of an operating system of the media data playback device;
a main memory comprising a second nonvolatile memory of the media data playback device, wherein the main memory retains data and programs stored in the main memory even if the media data playback device is shutdown;
an input unit operable to receive boot commands and shutdown commands; and
a processor connected to the first nonvolatile memory, the second nonvolatile memory, and the input unit, and operable to utilize the second nonvolatile as the main memory of the media data playback device such that the processor loads programs and data to the main memory, wherein the main memory receives and stores the loaded programs and data, and the processor executes a reboot method comprising:
clearing one or more memory areas occupied by data objects in the main memory according to a setting parameter of the media data playback device during a time window ranging from reception of a first instance of the shutdown commands to completion of a bootstrap process of media data playback device in response to a first instance of the boot commands subsequent to the first instance of the shutdown commands.

22. The media data playback device as claimed in claim 21, wherein the setting parameter is indicative of one of a plurality of memory related values, the reboot method further comprises:
clearing a portion of the main memory if the garbage collection setting is indicative of a specific value.

23. The media data playback device as claimed in claim 21, wherein the setting parameter comprises a garbage collection setting indicative of one of a plurality of garbage collection levels, the reboot method further comprises:
performing a garbage collection process for the main memory if the garbage collection setting is indicative of a low level garbage collection; and
clearing entirety of the main memory if the garbage collection setting is indicative of a high level garbage collection.

24. The media data playback device as claimed in claim 23, wherein the setting parameter is indicative of one of a plurality of garbage collection levels, the reboot method further comprises:
performing a portion of a bootstrapping process of the media data playback device before shutdown of the media data playback device in response to the first instance of the shutdown commands, and the portion of a bootstrapping process comprises:
triggering a first instance of a migration of the kernel upon a condition that the setting parameter is indicative of a high level garbage collection;
wherein reboot method further comprises:

recording a resume address of the second nonvolatile memory from which execution of the kernel is designated to resume in response to reboot of the media data playback device; and
shutting down the media data playback device.

25. The media data playback device as claimed in claim 24, further comprising:
disabling interrupt handing during the first instance of the migration of the kernel.

26. The media data playback device as claimed in claim 21, wherein the second nonvolatile memory comprises phase change random access memory.

27. The media data playback device as claimed in claim 21, wherein the reboot method further comprises:
configuring the setting parameter in response to statistics of system usage of the media data playback device.

28. The media data playback device as claimed in claim 21, wherein the setting parameter reflects to a user operation.

29. The media data playback device as claimed in claim 21, wherein upon receiving the first instance of the shutdown commands from the input unit, the processor clears one or more memory areas occupied by data objects in the main memory before shutdown of the media data playback device in response to the first instance of the shutdown commands.

30. A media data playback device, comprising:
a first nonvolatile memory operable to store a kernel of an operating system;
a main memory comprising a second nonvolatile memory of the media data playback device, wherein the main memory retains data and programs stored in the main memory even if the media data playback device is shutdown, and an instance of a migration of the kernel comprises loading of the kernel from the first nonvolatile memory to the second nonvolatile memory;
an input unit operable to receive a first boot command; and
a processor operable to execute a boot loader to trigger a first instance of the migration of the kernel in response to the first boot command, and, upon receiving a shutdown command from the input unit, the processor determines whether to further trigger a second instance of the migration of the kernel before shutdown of the media data playback device in response to the shutdown command.

31. A media data playback device, comprising:
a first nonvolatile memory operable to store a kernel of an operating system;
a main memory comprising a second nonvolatile memory of the media data playback device, wherein the main memory retains data and programs stored in the main memory even if the media data playback device is shutdown, and an instance of a migration of the kernel comprises loading of the kernel from the first nonvolatile memory to the second nonvolatile memory;
an input unit operable to receive a first boot command; and
a processor operable to trigger a first instance of the migration of the kernel in response to the first boot command, and, upon receiving a shutdown command from the input unit, the processor performs garbage collection for the second nonvolatile memory before shutdown of the media data playback device in response to the shutdown command.

32. A reboot method executable by a media data playback device of which a first nonvolatile memory stores a kernel of an operating system, a main memory comprising a second nonvolatile memory of the media data playback device, wherein the main memory retains data and programs stored in the main memory even if the media data playback device is shutdown, and an instance of a migration of the kernel comprises loading of the kernel from the first nonvolatile memory to the second nonvolatile memory, the reboot method comprising:

receiving a first boot command from an input unit of the media data playback device, wherein the first boot command is operable to trigger a bootstrapping process of the media data playback device which at least comprises a manipulation process of clearing the main memory;

executing a boot loader to trigger a first instance of the migration of the kernel in response to the first boot command in the bootstrapping process, wherein the bootstrapping process further comprises a manipulation process of the main memory associated with the first instance of the migration of the kernel;

receiving a shutdown command from the input unit; and performing a portion of the bootstrapping process of the media data playback device before shutdown of the media data playback device in response to the shutdown command, wherein the portion of the bootstrapping process comprises a manipulation process related to the main memory of the media data playback device.

* * * * *